No. 798,426. PATENTED AUG. 29, 1905.
J. B. LEVY.
CAMERA.
APPLICATION FILED JAN. 24, 1905.
2 SHEETS—SHEET 1.
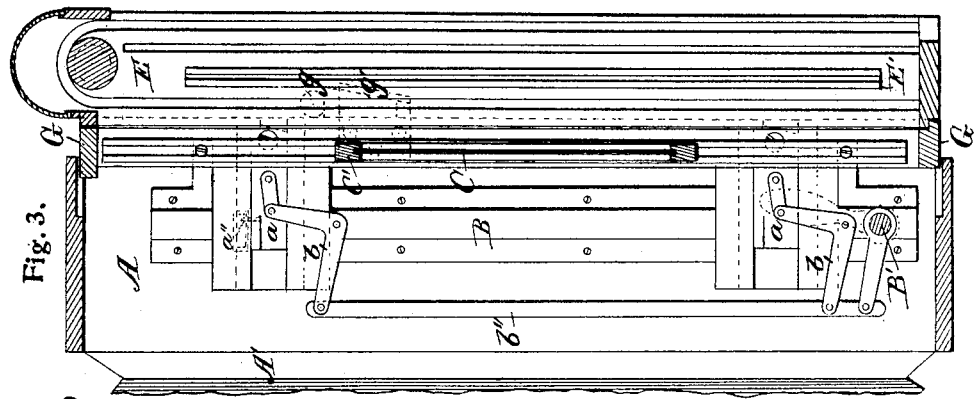
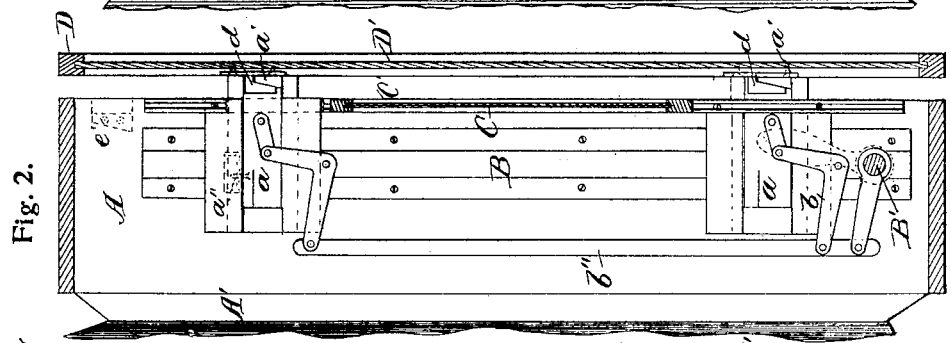
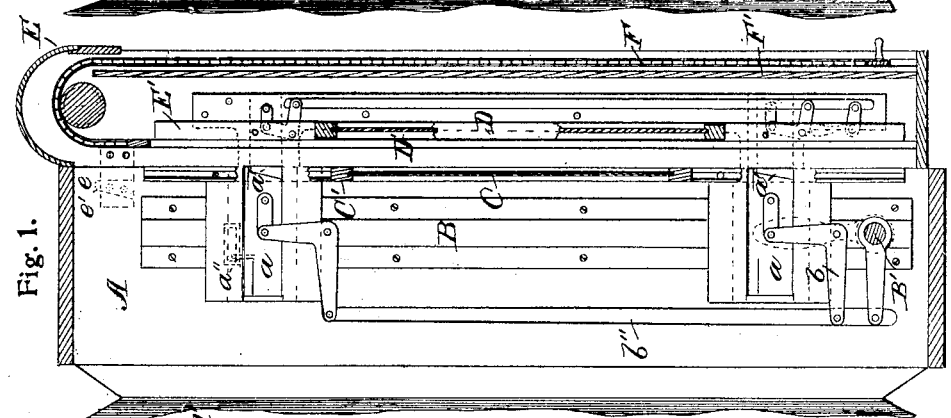
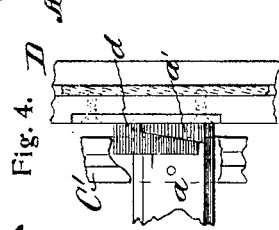
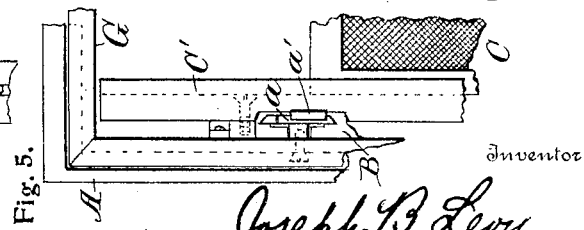
Witnesses
H. H. Johnson
C. E. Hebb
Inventor
Joseph B. Levy
By Eugene W. Johnson
Attorney No. 798,426. PATENTED AUG. 29, 1905.
J. B. LEVY.
CAMERA.
APPLICATION FILED JAN. 24, 1905.

2 SHEETS—SHEET 2.

UNITED STATES PATENT OFFICE.

JOSEPH B. LEVY, OF PHILADELPHIA, PENNSYLVANIA.

CAMERA.

No. 798,426.  Specification of Letters Patent.  Patented Aug. 29, 1905.

Application filed January 24, 1905. Serial No. 242,475.

*To all whom it may concern:*

Be it known that I, JOSEPH B. LEVY, a citizen of the United States, residing at Philadelphia, in the county of Philadelphia and State of Pennsylvania, have invented new and useful Improvements in Cameras, of which the following is a specification.

This invention appertains to improvements in copying-cameras, and has special reference to that type which are used in the production of photomechanical engravings for printing either in black and white or in colors.

A camera constructed in accord with my invention is provided adjacent to the rear end of the camera-box with a fixed or stationary support for a lined screen, such support being of any suitable form that will maintain the frame of the usual rectangular screen or a frame which holds a screen that may be rotated or turned, such screen being used in color-work. The vertical sides of the camera-box have attached thereto supports for horizontally-movable slides to which a ground-glass plate used in focusing is removably attached, the slides being connected to means for moving them in unison to adjust the ground-glass plate to and from the screen.

The invention also includes a holder for the sensitized plate of such construction that the sensitized plate may be moved so as to occupy the same position as the ground-glass focusing-plate, and the general arrangement and construction is such as to obviate removing the screen from the camera and provide a plate-holder with means whereby the sensitized plate may be adjusted to and from the fixed screen, as will be hereinafter set forth.

Figure 7:
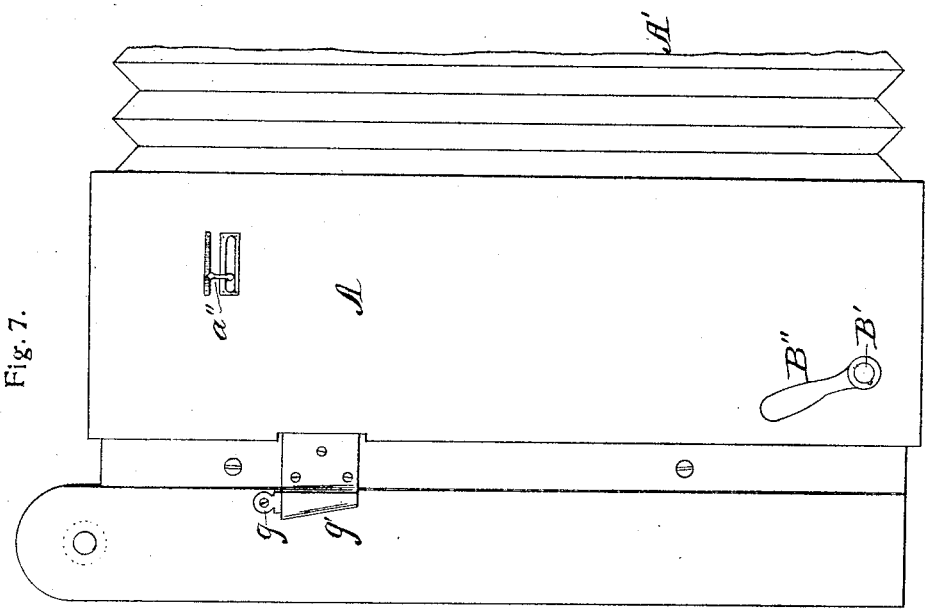
Figure 6:
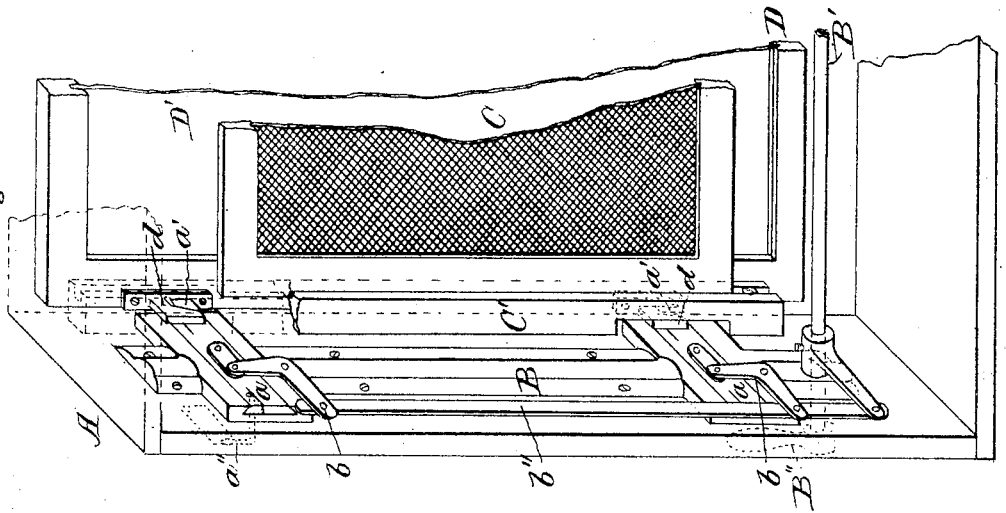

In the accompanying drawings, Figure 1 is a vertical section of a part of a camera, showing the plate-holder attached to the rear frame of the camera-box and provided with means for moving the sensitized plate to and from the screen. Fig. 2 is a vertical section, the plate-holder being detached from the camera-box, a ground-glass plate being supported by the slides of the camera-box. Fig. 3 is a vertical section of a modified form in which the sensitized plate-holder is removably attached to a frame secured to the slides of the camera.
Fig. 4 is a detail view of a part of one of the slides of the camera-box and of a part of the ground-glass frame. Fig. 5 is a rear elevation of a part of the camera-box shown in Fig. 3. Fig. 6 is a detail perspective view, looking from the front, of a part of the camera-box with the bellows removed; and Fig. 7 is a side elevation.

The part lettered A on the drawings represents the rear portion of a camera, and to the front of such part the bellows A' is attached. To the inner vertical sides of the frame A there are secured fixtures or castings B, each fixture having horizontal recesses for the reception of slides $a\ a$. The slides are slitted to insure a tight fit in the recesses, and the rear ends have laterally-projecting lugs $a'$ with inclined front edges, and one of the upper slides carries a pointer $a''$, which projects through slots in the fixture and frame, the outer end of the pointer being movable over a scale-plate, as shown in Fig. 7. The fixtures or castings B have bearings for bell-crank levers $b\ b$ and a shaft B'. The shaft extends through one of the fixtures B and through one of the sides of the frame A, its projecting end having a handle B''. The bell-crank levers $b$ are connected by links to the slides $a$ and to each other by bars $b''$, which extend below the lower bell-crank and engage arms on the shaft B', so that when the shaft is rocked the slides will be projected or retracted in unison.

Attached to the inner sides of the rectangular frame A so as to span the slides $a\ a$ are bars or supports for the screen or grating C. The grooved bars or supports C' hold the screen in fixed engagement with the frame A, and the screen becomes practically a part of the camera, though removable therefrom when desired. This construction avoids handling the screen and reduces the liability of breaking or injuring the same to a minimum.

As shown by Figs. 2, 4, and 6 of the drawings, the frame which carries the ground glass used in focusing the camera has attached to the side bars of the frame D, which surrounds the ground-glass plate D', hooks $d$, constructed to engage the lugs $a'$ of the slides $a\ a$, and in order to attach the ground-glass focusing-plate to the slides they are first projected. The hooks are then caused to engage the lugs, after which the slides may be retracted to properly place the focusing-plate in relation to the screen. After the camera has been adjusted the sensitized plate will occupy the position previously occupied by the ground-glass focusing-plate.

When the construction shown in Figs. 1 and 2 of the drawings is used, the frame A has attached thereto plates or wedges $e$, with which socketed plates $e'$, secured to the plate-holder, engage to connect the plate-holder E to the frame A. The plate-holder of the type shown in Fig. 1 has a frame consisting of vertical bars E', such bars being secured to slides which are secured to a casting or fixture attached to the sides of the frame E. The slides are connected to bell-cranks and a rock-shaft having beyond one side of the frame a handle whereby the slides and the sensitized plate may be moved against the ends of the slides $a$ $a$, so that the sensitized plate will occupy the same relative position as was occupied by the ground glass.

The plate-holder E is provided with a sliding curtain F and a removable back board F'', both of ordinary construction.

In the construction shown by Figs. 3 and 7, G refers to a sliding frame that is attached to the slides $a$ $a$ and is movable therewith. The frame G has socketed plates $g$ $g$, with which wedges $g'$, attached to the plate-holder, engage to hold the same connected to the movable frame G. With the construction shown by Fig. 3 the sensitized plate is held fixedly in the plate-holder, and such holder is movable with the frame G to and from the screen C.

To operate, the ground glass is moved to the desired position from the screen by means of the handle attached to the rock-shaft. The position of the ground glass is indicated by the pointer, which moves over the scale on the outside of the camera. After the camera has been focused the slides are moved rearward to admit of the removal of the ground glass. The plate-holder is then substituted for the ground glass and the slide or curtain drawn down to expose the sensitized plate, the camera-cap being on. The sensitized plate is now moved forward so that it will occupy the same plane as did the ground glass and is then ready for exposure. After exposure the holder is moved rearward, the slide or curtain is moved to close the plate-holder, and such plate-holder is removed.

With this invention the lined plate or screen is a fixture of the camera proper and is not carried to and from the dark room, thus obviating much risk of breaking the screen, while at the same time greatly reducing the weight of the plate-holder.

I do not limit myself to the details of construction as shown, excepting as specifically claimed, as the construction may be varied within the scope of the claims.

I claim—

1. The combination in a camera-box, of a ruled screen fixedly attached to the rear portion of the camera-box, supports and means for moving the supports carried by the camera-box, and a plate-holder adapted to engage the supports and to be movable thereby to and from the ruled screen, substantially as shown.

2. In a copying-camera, a camera-box the rear section thereof having secured thereto a screen, a screen-carrying frame provided with slides, means attached to the camera-box for moving the slides in unison, a focusing-plate for engagement with the slides and movable thereby to and from the screen, and a holder for a sensitized plate which is movable to and from the screen, for the purpose set forth.

3. In a copying-camera a camera-box provided with slide-supports, and means for reciprocating the slides in unison, a ruled screen fixedly attached to that part of the camera having the slides, means for attaching a focusing-plate to the slides, and a holder for a sensitized plate attachable to the camera-box so that the plate carried thereby may be positioned in the same relation to the screen as was previously occupied by the focusing-plate.

JOSEPH B. LEVY.

Witnesses:
 IRA STOVER MYERS,
 THEODORE C. JOHNSON.